United States Patent

Adams

[15] 3,701,155

[45] Oct. 24, 1972

[54] AUTOMATIC DIRECTION FINDER

[72] Inventor: Henry G. Adams, West Orange, N.J.

[73] Assignee: International Telephone and Telegraph Corporation, Nutley, N.J.

[22] Filed: Oct. 26, 1970

[21] Appl. No.: 84,037

[52] U.S. Cl. .............................. 343/117 R, 343/124
[51] Int. Cl. ................................................. G01s 3/42
[58] Field of Search .............. 343/117 R, 124, 117 A

[56] References Cited

UNITED STATES PATENTS

| 3,390,392 | 6/1968 | Mayer et al. | 343/117 R |
| 3,611,386 | 10/1971 | Perper | 343/117 R |

Primary Examiner—Benjamin A. Borchelt
Assistant Examiner—Richard Berger
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A first radio frequency (RF) intermediate frequency (IF) section is coupled to a sense antenna which receives an RF signal to which direction is to be determined. The IF output signal of this first section is used to phase lock a reference oscillator to this IF output signal. The reference oscillator operates at a frequency eight times the IF frequency to prevent spurious signals from appearing in the circuitry. A digital divide-by-eight frequency divider provides a first reference signal for phase locking the oscillator, a gate signal and a second reference signal which, together with the IF output of the first section, provides a visual indication of phase lock. A goniometer including a rotor and a pair of orthogonally disposed loop antennas also receive the RF signal for application to a second RF/IF section. The IF output signal of the second section is gated by the gate signal into an integrating amplifier. The output signal of the integrating amplifier is detected by a zero crossing detector whose output signal is applied to a squaring circuit and also a monostable multivibrator whose output signal drives a variable frequency (rate) pulse generator. The output signal of squaring circuit and the output signal of the pulse generator are operated on by logic circuitry whose output signal controls a stepper motor. The stepper motor mechanically adjusts the rotor of the goniometer to produce a null in the IF output signal of the second section. The rotor also moves a pointer to indicate relative bearing with respect to the bow. A gyro compass repeater may move a calibrated card or ring to display the true bearing of the signal.

16 Claims, 2 Drawing Figures

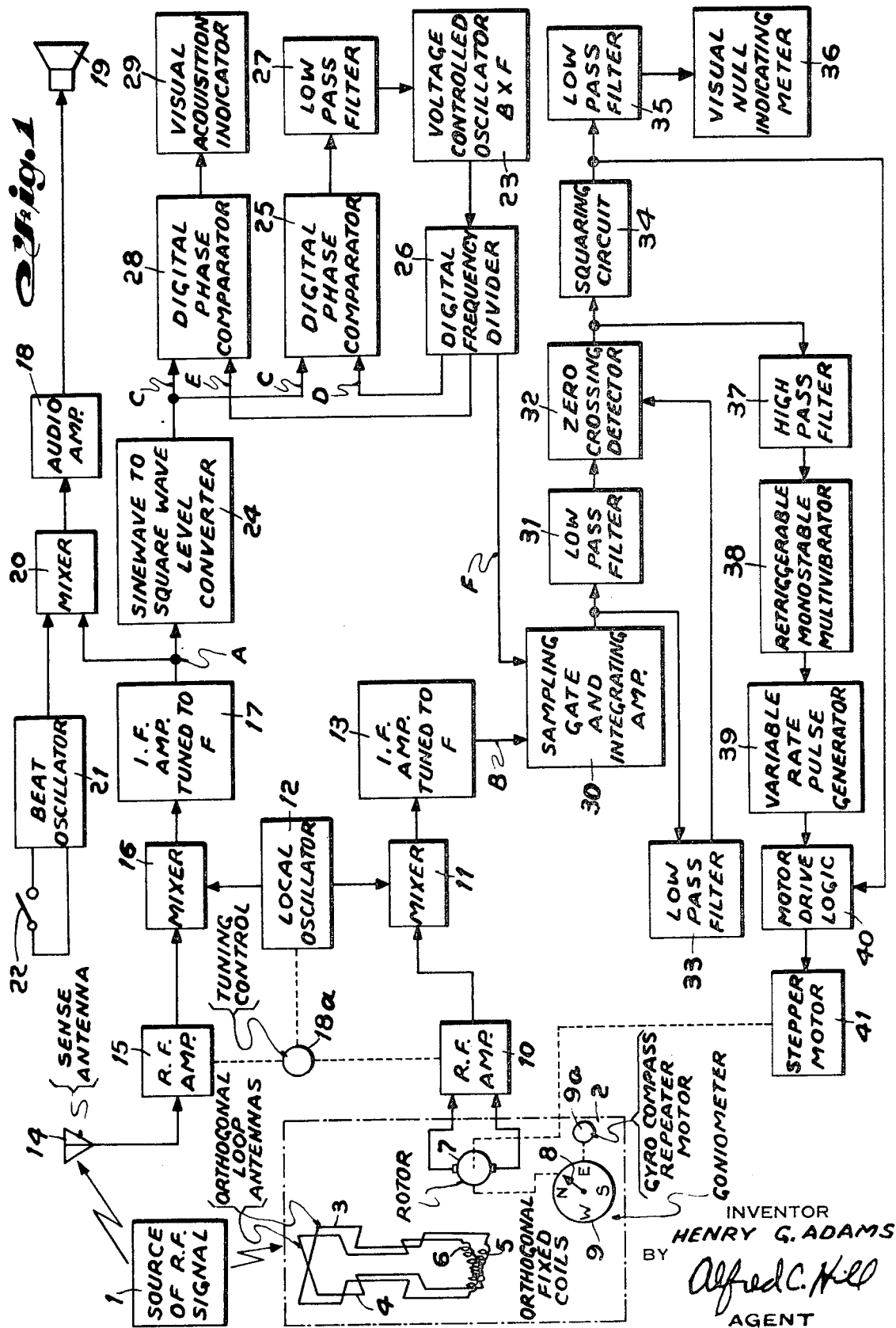

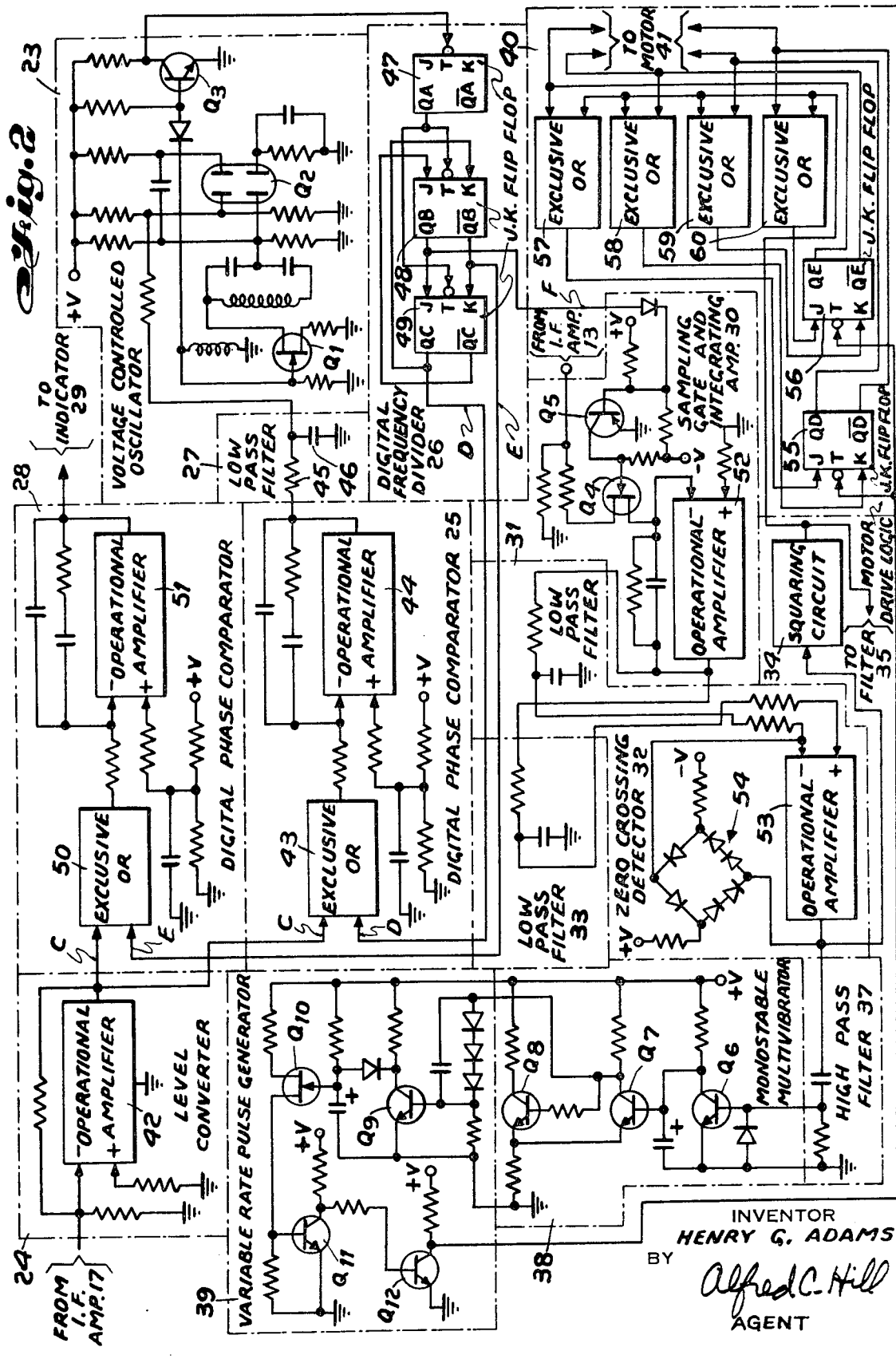

AUTOMATIC DIRECTION FINDER

BACKGROUND OF THE INVENTION

This invention relates to direction finders and more particularly to automatic direction finders.

The purpose of a direction finder of the automatic type is to automatically find the direction of an arriving RF (radio frequency) signal. The discussion herein with respect to the prior art and the new direction finder described hereinbelow will be limited to low frequency methods, since there is existing LF (low frequency) beacon service in existence internationally. The only antenna having both directivity and reasonable dimensions in this portion of the spectrum is a loop antenna.

The essential characteristics of this antenna are well known and have two important directional characteristics. First, the antenna has extremely sharp nulls. Secondly, the two nulls are 180° apart. The second characteristic results in an ambiguity problem.

When properly shielded the loop antenna responds only to the magnetic component of a RF signal wave front. The open circuit loop voltage produced in this antenna either leads or lags the electric component of the wave front produced by the RF signal by 90°. A vertical antenna responds only to the electrical field component of the wave front of a RF signal. Most importantly, the above-mentioned leading or lagging voltage can be utilized to determine the direction a loop antenna must be turned to achieve a correct null.

The term "automatic radio compass" refers to a direction finding system that sets itself with respect to the passing radio waves without manual manipulation.

Such a prior art device makes use of a loop antenna, the output of which is amplified and mixed in a balanced modulator with a locally generated audio frequency, in this case 90 cycles. The output of the balanced modulator contains 90 cycles sidebands that will reverse in phase as the antenna system of the loop type passes through the position of zero response. The modulator output, consisting of 90 cycle sidebands minus carrier, is mixed with a signal from a vertical antenna, the phase of which has been shifted 90°. This vertical antenna output thus replaces the carrier of the original signal, but unlike the original carrier voltage induced in a loop antenna does not have its polarity reversed as the antenna system is swung through a null. The result is that the 90 cycle modulation envelope of the resulting wave formed by this type of combination of loop and vertical antenna pickup will have a phase that will reverse as the loop position swings through a null. The modulation envelope is recovered by rectification, and the resulting 90 cycle voltage compared with a 90 cycle component obtained from the local modulating source. The comparison is obtained with the aid of an electronic control device operating on a reversible motor, which rotates the loop antenna in such a direction as to bring it to the correct null position. Whenever the loop is not directly on a null, this action is present and brings the loop to a null, whereupon no 90 cycle component appears in the receiver output and the loop antenna comes to rest. While the loop pattern has two nulls, only one of these nulls provides stable equilibrium. Consequently, the 180° ambiguity of the ordinary loop system is avoided.

The automatic direction finder of the automatic radio compass type gives a continuous indication of the exact course that one is traveling with respect to a bearing defined by the direction of travel of the radio waves produced by the RF signal being received. In this respect, the automatic compass differs from homing devices, since the latter indicates only whether one is heading along the bearing defined by the radio wave or is to the right or left of this bearing.

Another prior art method includes an oscilloscope display method which generally uses two loops constructed so as to intersect orthogonally with respect to each other. The output of each loop is amplified in a separate receiver and is used to drive a set of deflection plates in an oscilloscope. When properly adjusted, the oscilloscope display is a straight line showing the direction of the wave with respect to the loop antenna structure. The ambiguity problem can be eliminated by use of a sense antenna signal used to intensity modulate the oscilloscope beam which will eliminate one-half of the display.

SUMMARY OF THE INVENTION

An object of the present invention is to provide an improved automatic direction finder.

Another object of the present invention is to provide an improved automatic direction finder of the automatic radio compass type.

A feature of the present invention is the provision of an automatic direction finder to determine the direction to a radio frequency signal source comprising first means to receive the radio frequency signal and produce a first intermediate frequency signal having a given frequency and a given phase; second means including a goniometer to receive the radio frequency signal and produce a second intermediate frequency signal having the given frequency and a phase having a 90° phase relation to the given phase; a reference oscillator; third means coupled to the first means and the reference oscillator to phase lock the reference oscillator to the first intermediate frequency signal and to produce at least one gate signal having a given phase relationship with respect to the phase of the second intermediate frequency signal; fourth means coupled to the second means and the third means responsive to the one gate signal to gate the second intermediate frequency signal and to integrate the gated second intermediate frequency signal; fifth means coupled to the output of the fourth means to produce a control signal proportional to the deviation from a null in the second intermediate frequency signal; and sixth means coupled to the goniometer and the fifth means responsive to the control signal to achieve the null in the second intermediate frequency signal.

BRIEF DESCRIPTION OF THE DRAWING

FIG. 1 is a block diagram illustrating the direction finding system in accordance with the principles of the present invention; and FIG. 2 is a schematic diagram, partially in block form, of the circuitry of FIG. 1 following the IF amplifiers in both the sense and loop antenna RF/IF sections.

DESCRIPTION OF THE PREFERRED EMBODIMENT

Referring to FIG. 1, there is illustrated therein a block diagram of the automatic direction finding system in accordance with the principles of the present invention to determine the direction to a source of RF signal 1 which as pointed out hereinabove may be an LF beacon available presently internationally. It is of course to be noted that the automatic direction finding system of the present invention is not limited to the source 1 being an LF beacon, but may be a beacon in other frequency ranges, the sole difference being in the frequencies coupled through the RF/IF sections of the automatic direction finding system of the present invention.

The magnetic component of the RF waves produced by the RF signal from source 1 is received by goniometer 2 which includes a pair of orthogonally related loop antennas 3 and 4 coupled to orthogonally related fixed coils 5 and 6, respectively. The fixed coils 5 and 6 are inductively coupled to a movable rotor 7. Movable rotor 7 also, when rotating, drives a pointer 8 relative to a card 9 which may be directed toward magnetic north. It is through the use of rotor 7 and pointer 8 and gyrocompass repeater card 9 driven by gyrocompass repeater motor 9a that it is possible to determine the direction to source 1 when the rotor 7 produces a null in the output signal therefrom.

The output signals of rotor 7 are coupled to a second RF/IF section which includes RF amplifier 10, mixer 11 coupled to local oscillator 12 to provide a desired IF signal equal to F which is amplified in IF amplifier 13 and is present at point B.

The first RF/IF amplifier section is coupled to a vertical antenn 14 referred to as the sense antenna. Antenna 14 responds to the electric component of the RF waves produced by the RF signal of source 1. The output signal from antenna 14 is coupled to RF amplifier 15 and, hence, to mixer 16 which is mixed with the output of local oscillator 12 to produce an IF signal having a frequency F which in turn is amplified in IF amplifier 7 and appears at point A.

The sharing of local oscillator 12 by mixers 11 and 16 assures synchronous tuning of the two RF/IF sections. This tuning can be adjusted by tuning control 18 to enable reception of RF signals having a different frequency and yet enable the production of the IF signals having a frequency F at the output of amplifiers 13 and 17.

As pointed out hereinabove under the section "Background of the Invention," the magnetic component of the RF wave as received by antennas 3 and 4 either leads or lags the electric component of the RF wave received by antenna 14 by 90°. Therefore, the output of IF amplifier 17 at point A can be considered to have a 0°phase while the output of IF amplifier 13 at point B may have a +90° phase relationship or a −90° phase relationship with respect to the phase of the output signal at point A.

The bandwidth for the two RF/IF sections may be identical because only phase is to be covered in these sections. The bandwidth of IF amplifiers 13 and 17 is determined by the audio stage 18 which provides an audio indication of the automatic direction finder receiving an RF signal from source 1. This audio indication is provided in speaker 19 and is derived by coupling mixer 20 to the output of IF amplifier 17 and also to a beat oscillator 21 which is placed in operation by closing switch 22. The purpose of oscillator 21 and mixer 20 is to reduce the frequency F of the IF output signal from amplifier 17 to the audio frequency range of audio amplifier 18 to thereby provide an aural indication of receiving the RF signal from source 1.

A reference oscillator, identified as voltage controlled oscillator 23, having a frequency eight times the frequency F at the output of amplifiers 13 and 17 is phase locked to the output of amplifier 17 in the following manner. The output of amplifier 17 is converted to a square wave with a level change by sine wave to square wave level converter 24, The output signal of converter 24 is coupled to digital phase comparator 25. The output of oscillator 23 is coupled to a digital frequency divider 26 which produces a reference signal at point E having 90° phase relationship with respect to the phase of the output of converter 24 at point C. In addition, divider 26 provides a second reference signal at point D which is 90° displaced with respect to the reference signal at point E and 180° displaced with respect to the phase of the signal at point C. Further, divider 26 provides a gate signal at point F having a phase with respect to the phase of the output signal of amplifier 13 which is inphase or 180° out-of-phase, depending upon which side of the null goniometer 2 is located. For instance, if the output signal at point B is +90°, the phase of the output signal at point F will be also +90°, thereby providing 0° phase difference between the signals at points B and F. However, if the output signal of amplifier 13 at point B is −90° and the output signal at point F is still at +90°, then the phase relation between the signals at point B and point F is a 180° phase relationship.

Digital comparator 25 produces from the two input signals at points C and D a phase control signal which is coupled to low pass filter 27 for control of the frequency and, hence, the phase of oscillator 23 so as to lock the output of oscillator 23 to the phase of the output of amplifier 17, and thereby provide the proper phase relationship for the two reference signals and also the gate signal at the output of divider 26 to achieve the desired direction finding function.

Digital phase comparator 28 compares the phase of the output signal from the converter 24 (point C) with the second reference signal at the output of divider 23 (point F) which, as previously stated, has a 180° phase relationship with respect to the output signal at point C when phase lock is achieved. The output of comparator 28 will be high when phase lock is achieved and thereby when coupled to visual acquisition indicator 29 will provide a visual indication of achieving phase lock. Indicator 29 may be a lamp which will be lit only when the 180° phase relationship between the signals at points C and E is achieved, indicating the desired precise phase lock of oscillator 23.

After phase lock is achieved the output signal from amplifier 13 and the gate signal from divider 26 are coupled to sampling gate and integrating amplifier 30. The gate signal at point F gates the IF signal at the output of amplifier 13 to an integrating amplifier whose output is then coupled through a low pass filter 31 and, hence, to a zero crossing detector 32 which operates to detect the zero crossings of the gated IF signal at the output of amplifier 13. Low pass filter 33, coupled between the output of sampling gate and integrating amplifier 30, has a long time constant, for instance in the order of one minute, and is coupled to the zero crossing detector 32 to compensate for long term drift to offset component changes in the direction finder.

The output from detector 32 is coupled to a squaring circuit 34 and, hence, through a low pass filter 35 to a visual null indicating meter 36 which will provide an indication of when a null is achieved and the deviation from null including its magnitude and direction.

The output from detector 32 is also coupled through high pass filter 37 to a retriggerable monostable multivibrator 38 whose output drives a variable rate pulse generator 39. The output signal from generator 39 and circuit 34 is coupled to motor drive logic 40 which has the function of providing control signals for stepper motor 41 to provide rotation of rotor 7 in the proper direction to obtain the desired correct null to thereby provide the direction to source 1 from goniometer 2 as shown by the position of compass card 8 and with respect to magnetic north needle 9.

In summary, the direction finder of this invention employs two RF/IF receiver sections. Mixers 11 and 16 share a common local oscillator 12 to assure synchronous tuning of the two receivers. Sense antenna 14 is coupled to one of the receiver sections. The output signal of IF amplifier 17 is used to drive mixer 20 and additionally to phase lock reference oscillator 23 to the sense IF output of amplifier 17. Digital frequency divider circuit 26 provides a 90° phase shifted gating signal at output F and additionally divider 26 provides reference signals D and E displaced by 90°, with respect to each other. By using the reference signal at point E a visual acquisition indicator is activated to indicate correct phase lock of oscillator 23.

The orthogonal loop antennas 3, 4 of goniometer 2 are connected to the other RF/IF section and the output from amplifier 13 goes to digital circuitry. The gating signal from divider 23 at point F is used to gate sampling gate and integrating amplifier 30 and whose output is sensed by a sensitive zero crossing detector 32. The output of detector 32 is directed to motor drive logic 40. When the output level of detector 32 remains fixed for a protracted period, it causes the output of logic 40 to switch to a high speed condition. The polarity of the output voltage of detector 32 determines the direction of rotation of motor 41. When the loop antennas are driven across the null, the polarity of the output signal of detector 32 changes causing the motor to slow down. The motor causes the compass card 8 and the rotor 7 to move in small increments and eventually hunts back and forth through null.

When the receiver is not tuned to a signal and only noise is present, the output of detector 32 is a series of random pulses. Under these conditions, motor 41 is operated at slow speed and moves in random directions.

Referring to FIG. 2, there is illustrated therein in schematic diagram, partially in block form, of digital circuitry connected to the right of points A and B of FIG. 1. The IF signal at point A (the output of amplifier 17) is converted to a set of pulses to correspond to the individual cycles of the output signal of amplifier 17 by applying this signal to the inverting input of operational amplifier 42 which is biased to operate in its saturated condition so that at point C there is provided the desired square wave signal. Thus, amplifier 42 and the associated components convert low level sinusoidal signals to pulses compatible with transistor logic microcircuits.

The pulses from amplifier 42 are coupled to EXCLUSIVE OR gate 43 for comparison of the pulse output of amplifier 42 with the reference signal at point D from divider 26. As previously mentioned, these two signals are nominally in a 90° phase relationship. The output from EXCLUSIVE OR 43 is coupled to the inverting input of operational amplifier 44. The non-inverting input of amplifier 44 has coupled thereto a voltage which provides a threshold level for amplifier 44 above which the phase control signal is produced for coupling through low pass filter 27 including, for example, resistor 45 and capacitor 46, to dual gate field effect transistor Q2. Transistor Q2 is employed as a reactance modulator for the voltage controlled oscillator including transistor Q1. The output signal of Q1 is amplified by transistor Q3 and translated to logic level signals. The oscillator including transistor Q1 operates at 8 F which is above the frequency band of interest. This is done to prevent spurious signals from appearing in the unit.

Divider 26 includes three JK flip-flops 47, 48 and 49 with the output from transistor Q3 driving the triggering input of flip-flop 47 to provide a divide-by-two function which reduces incidental phase modulation. Flip-flops 48 and 49 are interconnected as illustrated and as driven through their triggering inputs T by the QA output of flip-flop 47. The interconnection of flip-flops 48 and 49 as illustrated provides a divide-by-four function resulting in an overall division of divide-by-eight so that the frequency output of the various signals from the divider 26 are equal to the frequency output of the IF signals from amplifiers 13 and 17. The interconnection of flip-flops 48 and 49 provides the reference signals at points D and E 90° out of phase. The reference signal at point D is taken from the QC output of flip-flop 49 for coupling to EXCLUSIVE OR gate 43. A reference signal at point E is taken from the $\overline{QB}$ complementing output of flip-flop 48 and is coupled to EXCLUSIVE OR 50.

EXCLUSIVE OR 50 compares the reference signal at point E with the output signal of amplifier 42. The output of EXCLUSIVE OR 50 is coupled to the inverting input of operational amplifier 51 having a threshold set by the bias arrangement coupled to the non-inverting input thereof, such that when the signals at points C and E are 180° out of phase a high voltage output will be provided from amplifier 51 so as to activate indicator 29 to indicate the phase lock of oscillator 23. When the indicator 29 is activated, such as a brightly lit lamp the following information is provided to the operator, 1) signals at points C and D are 90° out of phase, 2) signals at points C and E are 180° out of phase thereby indicating that the phase of the internal sampling gate at point F is precisely correct and 3) the RF signal has enough amplitude to assure correct operation.

The gate signal from divider 26 is removed from the output QB of flip-flop 48 and is coupled as a gate signal to transistor Q5. This gate signal causes conduction of Q4 thereby gating the IF signal output of amplifier 13 to the operational amplifier 52 which is biased to provide an integration of the gated IF signals passed through transistor Q4. The gate signal at point F has a width which is equal to one-half cycle of the incoming IF input from amplifier 13.

Depending on the orientation of rotor 7 with respect to loop antennas 3 and 4, the output signal of the operational amplifier 52 will swing in a positive or negative direction. The output signal from operational amplifier 52 is coupled through low pass filter 31 and, hence, to the inverting input of operational amplifier 53 which has in its feedback from the output of amplifier 53 to the inverting input a diode bridge network 54. This arrangement enables detection of the zero crossings of the output signal from amplifier 52. To correct for system offset errors due to component changes, the non-inverting input of amplifier 53 is coupled to the output of operational amplifier 52 through a low pass filter 33 having a long time constant, for instance, in the order of 1 minute.

The output signal of operational amplifier 53 is coupled through high pass filter 37 to monostable multivibrator 38. Transistors Q6, Q7 and Q8 form a noise detector that is used as follows; when the output level of the zero crossing detector remains fixed, Q6 will stop conducting which will allow Q7 to switch on after a delay. This causes Q9 to shut off effectively connecting its collector resistor in parallel with the emitter resistor of unijunction transistor Q10 causing it to increase the frequency of the pulse generated which is then amplified in transistors Q11 and Q12. In a similar manner, when the goniometer 2 is stepped back and forth across the null, the succession of level changes will cause unijunction transistor Q10 to fire at a lower rate. This variable frequency pulse signal is used to trigger two JK flip-flops 55 and 56 contained in motor drive logic 40. The J input of flip-flop 55 is connected to the output of EXCLUSIVE OR gate 57 which compares the QE output of flip-flop 56 with the output of squaring circuit 34. The K input of flip-flop 55 is coupled to the output of EXCLUSIVE OR 58 which compares the output signal of circuit 34 to the $\overline{QE}$ output signal of flip-flop 56. The QD output signal of flip-flop 55 is coupled to EXCLUSIVE OR 59 which compares this signal with the square wave output signal of circuit 34. The $\overline{QD}$ output signal of flip-flop 55 is coupled to EXCLUSIVE OR gate 60 which compares this signal with the square wave output signal of circuit 34. The output of EXCLUSIVE OR gate 59 is coupled to the K input of flip-flop 56 and the output of EXCLUSIVE OR gate 60 is coupled to the J input of flip-flop 56. With the arrangement shown and with the control to motor 41 being taken from the outputs of flip-flops 55 and 56 as illustrated, the direction control signal for motor 41 comes from the zero crossing detector connected to each of the EXCLUSIVE OR gates 57–60 and upon a level change causes the output sequence of flip-flops 55 and 56 to reverse. The output signal of JK flip-flops 55 and 56 are used to drive stepper motor 41 which in turn rotates rotor 7 and, hence, produces a null in the IF signal output of amplifier 13. At the same time, as pointed out hereinabove, when rotor 7 is driven by motor 41, the pointer 8 is moved relative to gyrocompass repeater card 9 and thereby will provide an indication of the direction to source 1 from the direction finder and, hence, the boat or other vehicle carrying the direction finder.

The advantages of the direction finder of the present invention is that the bandwidth of the RF/IF sections are identical because only phase is to be recovered and the bandwidth of IF amplifiers 13 and 17 is determined only by audio amplifier 18. The bandwidth of the phase lock loop including oscillator 23, divider 26, comparator 25 and filter 27 is optimized for its purpose and is determined solely by the signals involved. The direction finder of this invention will, in addition, lock onto very weak signals, in fact, onto signals weaker than can be identified by the aural section of the direction finder including mixer 20, oscillator 21, amplifier 18 and speaker 19.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic direction finder to determine the direction to a radio frequency signal source comprising:

first means to receive said radio frequency signal and produce a first intermediate frequency signal having a given frequency and a given phase;

second means including a goniometer to receive said radio frequency signal and produce a second intermediate frequency signal having said given frequency and a phase having a 90° phase relation to said given phase;

a reference oscillator;

third means coupled to said first means and said reference oscillator to phase lock said reference oscillator to said first intermediate frequency signal and to produce at least one gate signal having a given phase relationship with respect to said phase of said second intermediate frequency signal;

fourth means coupled to said second means and said third means responsive to said one gate signal to gate said second intermediate frequency signal and to integrate said gated second intermediate frequency signal;

fifth means coupled to the output of said fourth means to produce a control signal proportional to the deviation from a null in said second intermediate frequency signal; and sixth means coupled to said goniometer and said fifth means responsive to said control signal to achieve said null in said second intermediate frequency signal.

2. A direction finder according to claim 1, further including seventh means coupled to said first means and said third means to provide a visual indication of said phase lock.

3. A direction finder according to claim 1, further including seventh means coupled to said fifth means to provide a visual indication of achieving said null.

4. A direction finder according to claim 1, further including
seventh means coupled to said first means to provide an aural indication of receiving said radio frequency signal.

5. A direction finder according to claim 1, wherein said third means includes a digital phase locked loop.

6. A direction finder according to claim 1, wherein said reference oscillator generates a frequency having a value N times said given frequency, where N is an integer greater than one.

7. A direction finder according to claim 6, wherein N is equal to eight, and
said third means includes a digital phase locked loop having a digital divide-by-eight frequency divider, said frequency divider producing said one gate signal.

8. A direction finder according to claim 1, wherein said fifth means includes a zero crossing detector to produce said control signal.

9. A direction finder according to claim 1, wherein said reference oscillator generates a frequency having a value eight times said given frequency; and said third means includes
a sine wave to square wave converter coupled to said first means,
a digital divide-by-eight frequency divider coupled to said reference oscillator providing in addition to said one gate signal, a first reference signal having a nominal phase 90° out of phase with respect to said given phase,
a digital phase comparator coupled to said converter and said frequency divider responsive to the square wave output of said converter and said first reference signal to produce a phase control signal, and
a low pass filter coupled between said comparator and said reference oscillator to couple said phase control signal to said reference oscillator for phase control thereof.

10. A direction finder according to claim 9, wherein said comparator includes
an EXCLUSIVE OR gate coupled to said converter and said frequency divider responsive to the square wave output of said converter and said first reference signal, and
an operational amplifier having a threshold level coupled to the output of said EXCLUSIVE OR gate to produce said phase control signal.

11. A direction finder according to claim 9, wherein said frequency divider provides in addition to said one gate signal and said first reference signal, a second reference signal having a nominal phase 180° out of phase with respect to said given phase; and further including
an EXCLUSIVE OR gate coupled to said converter and said frequency divider responsive to the square wave output of said converter and said second reference signal,
an operational amplifier having a threshold level coupled to the output of said EXCLUSIVE OR gate, and
a visual indicator coupled to the output of said operational amplifier to provide a visual indication of said phase lock.

12. A direction finder according to claim 11, wherein said frequency divider includes
a first JK-flip-flop coupled to be triggered by the output signal of said oscillator on its trigger input and provide a divide-by-two output signal on its output,
a second JK-flip-flop coupled to said first flip-flop triggered by said output signal of said first flip-flop on its trigger input,
a third JK-flip-flop coupled to said first flip-flop triggered by said output signal of said first flip-flop on its trigger input,
the output of said second flip-flop being coupled to the J input of said third flip-flop,
the complementing output of said second flip-flop being coupled to the K input of said third flip-flop,
the output of said third flip-flop being coupled to the K input of said second flip-flop, and
the complementing output of said third flip-flop being coupled to the J input of said second flip-flop,
said one gate signal being provided at the output of said second flip-flop,
said first reference signal being provided at the output of said third flip-flop, and
said second reference signal being provided at the complementing output of said second flip-flop.

13. A direction finder according to claim 1, wherein said fourth means includes
a gate circuit coupled to said second means and said third means to gate said second intermediate frequency signal to the output of said gate circuit by said one gate signal, and
a first operational amplifier coupled to the output of said gate circuit to integrate said gated second intermediate frequency signal;
said fifth means includes
a second operational amplifier coupled to the output of said first operational amplifier to detect the zero crossings of said gated second intermediate frequency signal to produce said control signal; and
said sixth means includes
a squaring circuit coupled to the output of said second operational amplifier,
a monostable multivibrator coupled to the output of said second operational amplifier,
a variable rate pulse generator coupled to the output of said multivibrator, and
logic circuitry coupled to the output of said pulse generator, the output of said squaring circuit and said goniometer to control said goniometer to achieve said null.

14. A direction finder according to claim 13, further including
a visual indicator coupled to the output of said squaring circuit to provide a visual indication of achieving said null.

15. A direction finder according to claim 1, wherein said first means includes
a vertical antenna responding to the electric field component of said radio frequency signal,
a first radio frequency amplifier coupled to said vertical antenna,
a local oscillator, a first mixer coupled to said first radio frequency amplifier and said local oscillator to produce said first intermediate frequency signal, and a first intermediate frequency amplifier coupled to said first mixer; and said second means includes said goniometer having a rotor coupled to said sixth means to achieve said null, and a pair of orthogonally related loop antennas responding to the magnetic field component of said radio frequency signal, said rotor being coupled to said loop antennas, a second radio frequency amplifier coupled to said rotor, a second mixer coupled to said second radio frequency amplifier and said local oscillator to produce said second intermediate frequency signal, and a second intermediate frequency amplifier coupled to said second mixer.

16. A direction finder according to claim 15, wherein said reference oscillator generates a frequency having a value eight times said given frequency;

said third means includes a sine wave to square wave converter coupled to said first intermediate frequency amplifier, a digital divide-by-eight frequency divider coupled to said reference oscillator providing in addition to said one gate signal, a reference signal having a nominal phase 90° out of phase with respect to said given phase, a digital phase comparator coupled to said converter and said frequency divider responsive to the square wave output of said converter and said reference signal to produce a phase control signal, and a low pass filter coupled between said comparator and said reference oscillator to couple said phase control signal to said reference oscillator for phase control thereof;

said fourth means includes a gate circuit coupled to said second intermediate frequency amplifier and said frequency divider to gate said second intermediate frequency signal to the output of said gate circuit by said one gate signal, and a first operational amplifier coupled to the output of said gate circuit to integrate said gated second intermediate frequency signal;

said fifth means includes a second operational amplifier coupled to the output of said first operational amplifier to detect the zero crossings of said gated second intermediate frequency signal to produce said control signal; and said sixth means includes a squaring circuit coupled to the output of said second operational amplifier, a monostable multivibrator coupled to the output of said second operational amplifier, a variable rate pulse generator coupled to the output of said multivibrator, and logic circuitry coupled to the output of said pulse generator, the output of said squaring circuit and said goniometer to control said rotor to achieve said null.

* * * * *